(12) United States Patent
Shijo et al.

(10) Patent No.: US 6,690,518 B2
(45) Date of Patent: Feb. 10, 2004

(54) CAMERA-ATTACHMENT LENS SYSTEM (75) Inventors: Kae Shijo, Saitama (JP); Shinichiro Ishii, Saitama (JP); Takayuki Ito, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/028,422

(22) Filed: Dec. 28, 2001

(65) Prior Publication Data
US 2003/0090811 A1 May 15, 2003

(30) Foreign Application Priority Data
Jan. 10, 2001 (JP) ....................... 2001-002878

(51) Int. Cl.$^7$ .............................. G02B 15/08
(52) U.S. Cl. ....................... 359/675; 359/672
(58) Field of Search ................ 359/672–675, 359/774

(56) References Cited

U.S. PATENT DOCUMENTS

| | | | | |
|---|---|---|---|---|
| 4,456,340 A | * | 6/1984 | Ikemori ................ | 359/675 |
| 4,591,234 A | * | 5/1986 | Hamanishi ............ | 359/675 |
| 4,830,474 A | * | 5/1989 | Nakayama et al. .... | 359/675 |
| 5,253,112 A | * | 10/1993 | Suzuki et al. ......... | 359/675 |

FOREIGN PATENT DOCUMENTS

JP  8-114743  5/1996  ........ G02B/13/00

OTHER PUBLICATIONS

Japanese language brochure, entitled "Nikon Fieldscope", published Jun. 20, 2001, along with an English language brochure, entitled "Nikon Fieldscopes", published Aug. 1998.

* cited by examiner

*Primary Examiner*—Jordan M. Schwartz
*Assistant Examiner*—Jessica Stultz
(74) *Attorney, Agent, or Firm*—Greenblum & Bernstein, P.L.C.

(57) ABSTRACT

A camera-attachment lens system includes a positive condenser lens system and a positive image-forming lens system, and satisfies the following conditions:

$$1.5 < fa/fco < 2.4 \quad (1)$$

$$0.08 < DO/fa < 0.16 \quad (2)$$

$$1.65 < Nco \quad (3)$$

wherein
  fa: the combined focal length of the condenser lens system and the image-forming lens system;
  fco: the focal length of the condenser lens system;
  DO: the distance from the image-forming plane of the objective optical system to the most objective-optical-system side surface of the condenser lens system; and
  Nco: the refractive index of the condenser lens system.

3 Claims, 6 Drawing Sheets

— d Line
---- g Line
---- C Line

-2.0   2.0
SPHERICAL
ABERRATION

CHROMATIC
ABERRATION

-0.2   0.2
LATERAL
CHROMATIC
ABERRATION

-2.0   2.0
ASTIGMATISM

-5.0 %  5.0
DISTORTION

— d Line
······· g Line
--- C Line

-2.0  2.0
SPHERICAL
ABERRATION

CHROMATIC
ABERRATION

-0.2  0.2
LATERAL
CHROMATIC
ABERRATION

-2.0  2.0
ASTIGMATISM

-5.0 %  5.0
DISTORTION

—— d Line
······ g Line
---- C Line

-2.0   2.0
SPHERICAL
ABERRATION

CHROMATIC
ABERRATION

Fig. 6B
W=1.2°

-0.2   0.2
LATERAL
CHROMATIC
ABERRATION

-2.0   2.0
ASTIGMATISM

Fig. 6D
W=1.2°

-5.0 %  5.0
DISTORTION

CAMERA-ATTACHMENT LENS SYSTEM

BACKGROUND OF THE INVENTION

1. Field of the Invention

The present invention relates to a camera-attachment lens system which is used instead of an eyepiece optical system of a vision-optical system, such as an astronomical telescope or a spotting scope (terrestrial monocular), and is arranged to re-form an image formed by an objective optical system.

2. Description of the Prior Art

In commercially-available attachment lens systems of the above type, the correcting of field curvature and astigmatism are not sufficiently made when these attachment lens systems are actually used, so that the formed image thereby are prone to be blurred at the periphery of the view field. Accordingly, such a poor image quality does not satisfy the users of thereof.

SUMMARY OF THE INVENTION

The object of the present invention is to provide a camera-attachment lens system which can reduce field curvature and astigmatism, and can maintain suitable image-forming performance up to the periphery of the view field.

A camera-attachment lens system of the present invention is provided behind an objective optical system, and is arranged to relay a real image formed by an objective optical system, and to re-form a real image. In order to achieve the above object, there is provided a camera-attachment lens system including a positive powered (hereinafter, positive) condenser lens system and a positive image-forming lens system, in this order from the objective optical system; and the camera-attachment lens system satisfies the following conditions:

$$1.5 < fa/fco < 2.4 \quad (1)$$

$$0.08 < DO/fa < 0.16 \quad (2)$$

$$1.65 < Nco \quad (3)$$

wherein
fa designates the combined focal length of the condenser lens system and the image-forming lens system;
fco designates the focal length of the condenser lens system;
DO designates the distance, along the optical axis, from the image-forming plane of the objective optical system to the most objective-optical-system side surface of the condenser lens system; and
Nco designates the refractive index of the condenser lens system.

More specifically, the image-forming lens system includes a meniscus first lens element having the convex surface facing toward the objective optical system, cemented lens elements constituted by a negative biconcave second lens element and a positive biconvex third lens element, and a positive fourth lens element, in this order from the objective optical system. The image-forming lens system preferably satisfies the following conditions:

$$1.60 < Np \quad (4)$$

$$0.3 < fa/f1 < 1.3 \quad (5)$$

$$3.5 < fa/r_{1\text{-}2} < 6.5 \quad (6)$$

wherein
Np designates the average refractive index of the positive lens elements in the image-forming lens system;
f1 designates the focal length of the first lens element of the image-forming lens system; and
$r_{1\text{-}2}$ designates the radius of curvature of the surface of the first lens element, the surface of which faces toward the re-image-forming plane.

As explained, the camera-attachment lens system of the present invention is an optical system which is used instead of an eyepiece optical system provided behind the objective optical system in the vision-optical system, and is arranged to relay and to re-form an image formed by the objective optical system. More specifically, with respect to a lens arrangement, the camera-attachment lens system includes the positive condenser lens system and the positive image-forming lens system, in this order from the objective optical system. The image-forming lens system includes the meniscus first lens element having the convex surface facing toward the objective optical system, the cemented lens elements constituted by the negative biconcave second lens element and the positive biconvex third lens element, and the positive fourth lens element, in this order from the objective optical system.

According to the above arrangement, the camera-attachment lens system, which can reduce field curvature and astigmatism, and can maintain suitable image-forming performance up to the periphery of the view field, can be obtained.

The present disclosure relates to subject matter contained in Japanese Patent Application No. 2001-2878 (filed on Jan. 10, 2001) which is expressly incorporated herein in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 10:
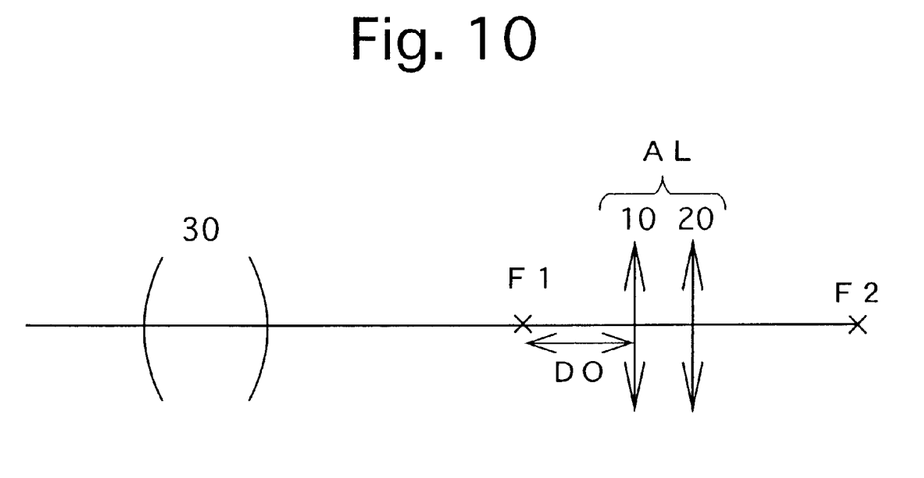
FIG. 10 is a schematic view of the entire optical arrangement in which the camera-attachment lens system is combined with the objective optical system.

FIG. 10 shows the schematic view of the entire optical arrangement in which the camera-attachment lens system AL is combined with the objective optical system 30. For viewing operation, the objective optical system uses an eyepiece optical system instead of the camera-attachment lens system AL. The camera-attachment lens system AL is an optical system which re-forms an image formed on an image-forming plane F1 onto a re-image-forming plane F2, and includes a positive condenser lens system 10 and a positive image-forming lens system 20, in this order from the objective optical system 30. The image-forming lens system 20, as shown in the lens arrangements of FIGS. 1, 3, 5 and 7, includes a meniscus first lens element 21 having the convex surface facing toward the objective optical system 30, a negative second lens element 22, a positive third lens element 23 and a positive fourth lens element 24, in this order from the objective optical system 30. Furthermore, the negative second lens element 22 and the positive third lens element 23 are cemented together. It is preferable that the power of the cemented lens elements is negative. Generally, in the vision-optical systems, the objective optical system 30 is provided under the condition that aberrations otherwise occur therein are corrected within the objective optical system 30 itself, independently of other optical systems.

Condition (1) specifies the distribution of the power of the condenser lens system 10 with respect to the power of the entire camera-attachment lens system AL.

If fa/fco exceeds the upper limit of condition (1), coma largely occurs.

If fa/fco exceeds the lower limit of condition (1), distortion largely occurs.

Condition (2) is for minimizing the reduction of light amount due to scratches and/or dust on the first surface, i.e., closest to the objective optical system, of the condenser lens system 10. The first surface of the condenser lens system 10 is prone to receiving dust, and/or to being scratched, since the first surface is exposed to the outside before the camera-attachment lens system AL is combined with the objective optical system 30.

If DO/fa exceeds the lower limit of condition (2), the reduction of light amount due to scratches and/or dust becomes noticeable. If there is a scratch or a spec of dust, the size of which is φ, on the first surface, the reduction of light amount $(\phi/\phi1)^2$ occurs with respect to the diameter φ1 of a bundle of light rays. As explained, DO is the distance, along the optical axis, from the image-forming plane of the objective optical system 30 to the most objective-optical-system side surface of the condenser lens system 10. By increasing DO so that condition (2) is satisfied, the reduction of light amount due to scratches and/or dust can be minimized.

If DO/fa exceeds the upper limit of condition (2), the diameter of the condenser lens system 10 becomes larger.

Condition (3) specifies the refractive index of the condenser lens system 10, and is for reducing the Petzval Sum thereof.

If Nco exceeds the lower limit of condition (3), the Petzval Sum becomes larger, so that field curvature and astigmatism become larger.

Condition (4) specifies the refractive indexes of the positive lens elements in the image-forming lens system 20, and for reducing the Petzval Sum thereof.

If Np exceeds lower limit of condition (4), the Petzval Sum becomes larger, so that field curvature and astigmatism become larger.

Condition (5) specifies the power of the first lens element 21 of the image-forming lens system 20.

If fa/f1 exceeds the upper limit of condition (5), coma cannot be corrected.

If fa/f1 exceeds the lower limit of condition (5), the Z value (centering coefficient) decreases, so that the manufacture of the first lens element 21 becomes difficult. Here, the Z value is to indicate the degree of ease of centering the first lens element, and is defined as follows:

$$Z=|(h1/r1)\pm(h2/r2)|/2$$

wherein h1 designates the height from the optical axis to the peripheral light ray on the first surface of the first lens element 21;

h2 designates the effective radius of the second surface of the first lens element 21;

r1 designates the radius of curvatures of the first surface of the first lens element 21;

r2 designates the radius of curvatures of the second surface of the first lens element 21;

Note that (i) when the signs of r1 and r2 are different, the "+" sign is used; and when the signs of r1 and r2 are the same, the "−" sign is used; and (ii) the larger the Z value is, the easier the centering of the first lens element 21 can be done.

Condition (6) specifies the shape of the first lens element 21 of the image-forming lens system 20.

If $fa/r_{1-2}$ exceeds the lower limit of condition (6), the correcting of coma becomes difficult.

If $fa/r_{1-2}$ exceeds the upper limit of condition (6), the radius of curvature of the first lens element 21 becomes smaller, so that it is difficult to machine the first lens element 21.

Specific numerical data of the embodiments will be described hereinafter. In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, fo designates the focal lengths of the objective optical system 30, and fa designates the focal length of the camera-attachment lens system AL; Fo designates the F-number of the objective optical system 30, and Fa designates the effective F-number of the camera-attachment lens system Al; fbo designates the back focal distance of the objective optical system 30, and fba designates the back focal distance of the camera-attachment lens system Al; W designates the half angle-of-view (°) of the objective optical system 30; m designates the magnification of the camera-attachment lens system AL; r designates the radius of curvature, d designates the lens-element thickness or distance between lens elements, Nd designates the refractive index of the d-line, and v designates the Abbe number.

The numerical data and aberration diagrams of the embodiments to be discussed hereinafter are obtained under the condition that the camera-attachment lens system AL of the present invention is used in a terrestrial telescope (monocular) including the objective optical system 30 having an erecting prism 40 which is common for all the embodiments, and the camera-attachment lens systems AL, each of which will be explained in respective embodiment.

Figure 9:
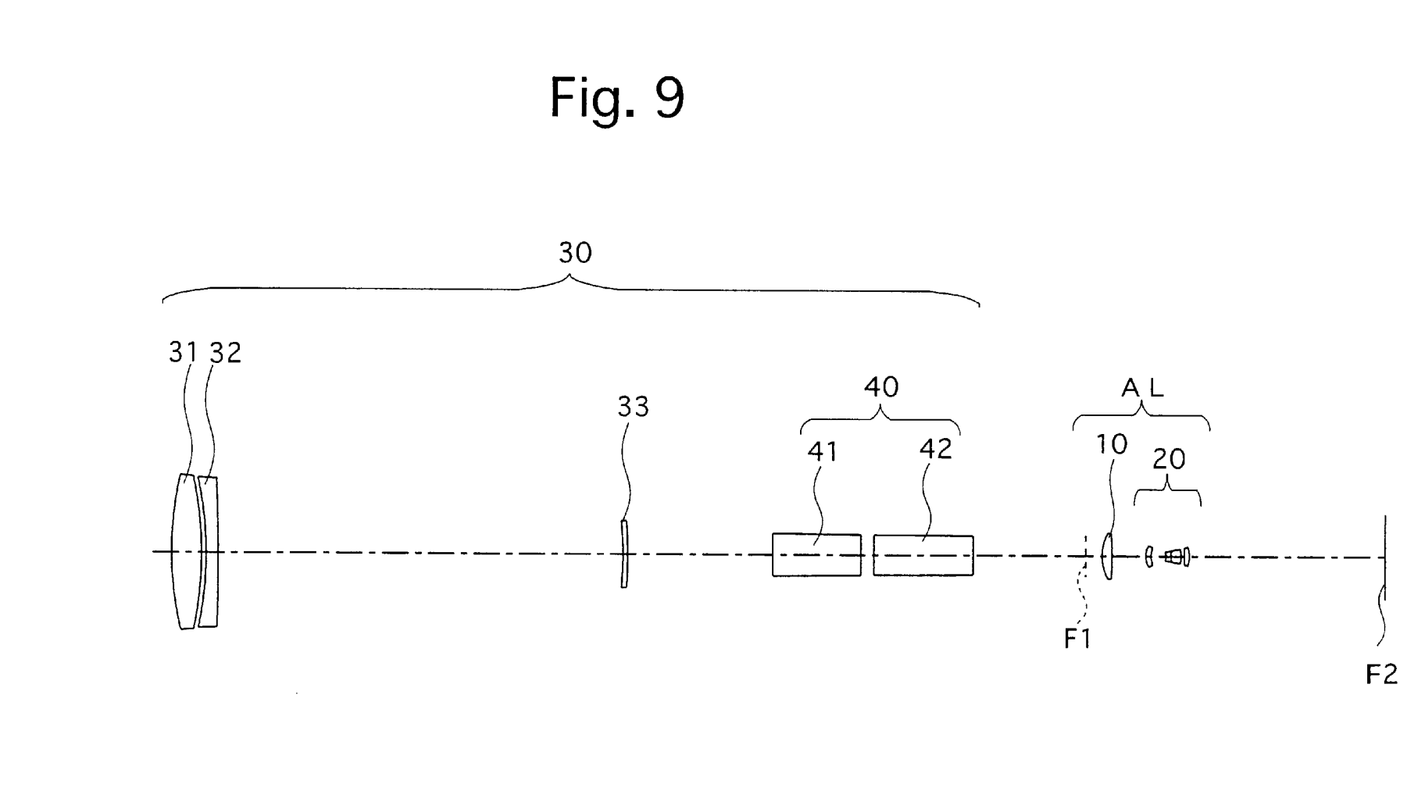
FIG. 9 is the entire optical arrangement in which the camera-attachment lens system of the first embodiment is combined with the objective optical system.

FIG. 9 is the optical arrangement in which the camera-attachment lens system of the first embodiment is combined with the common objective optical system 30. The objective optical system 30 includes a positive lens element 31, a negative lens element 32, a negative lens element 33 and an erecting optical system (the erecting prism) 40, in this order from the object. The erecting optical system 40 includes two triangle (right-angle) prisms 41 and 42, each of which has the two reflection surfaces. Aberrations otherwise occur in the objective optical system 30 is corrected within the objective optical system 30 itself, independently of other optical systems. Accordingly, the focal length, the F-number Fo, the back focal distance fbo and the half angle-of-view are common for the objective optical systems 30 of all the embodiments. The objective optical system 30 shown in FIG. 9 is an example, so that the optical arrangement of the objective optical system 30 is not limited to the depicted one. If an erected image is not required, the camera-attachment lens system AL can dispense with the erecting optical system 40.

[Embodiment 1]

Figure 1:
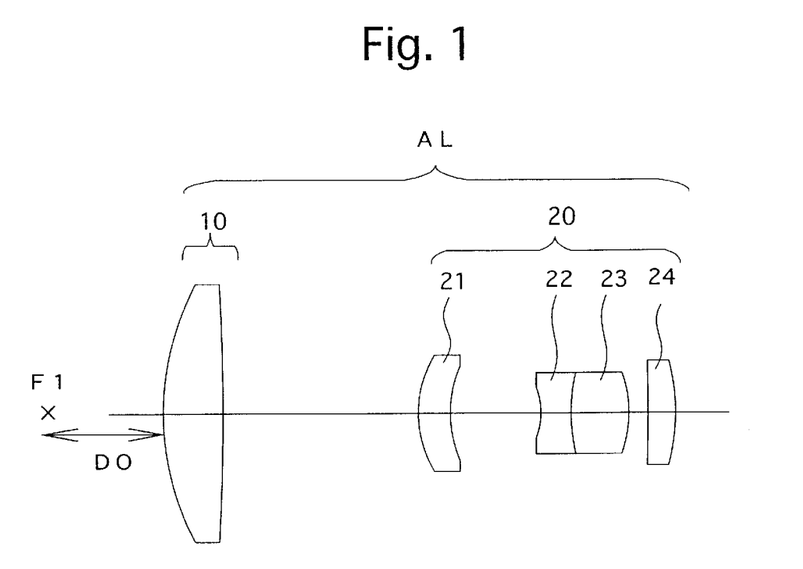
FIG. 1 shows a lens arrangement of a camera-attachment lens system according to a first embodiment of the present invention.
Figures 2A, 2B:
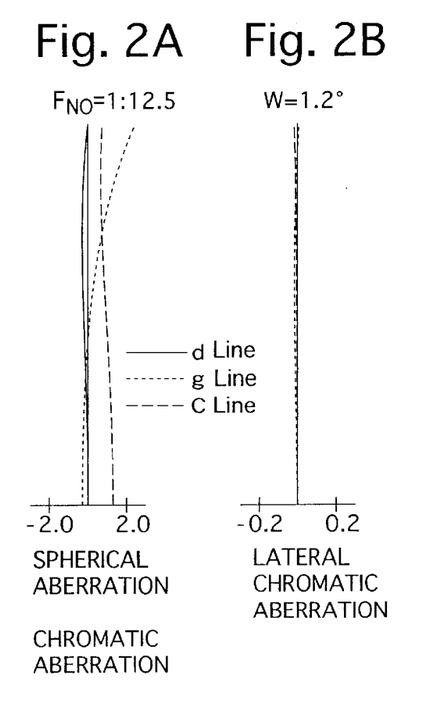
FIGS. 2A, 2B, 2C and 2D show aberrations occurred in an entire optical system in which the camera-attachment lens system of FIG. 1 is combined with an objective optical system.
Figure 2C:
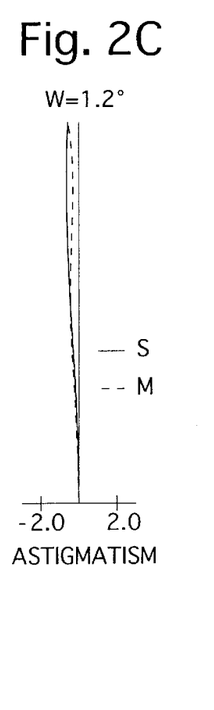
Figure 2D:
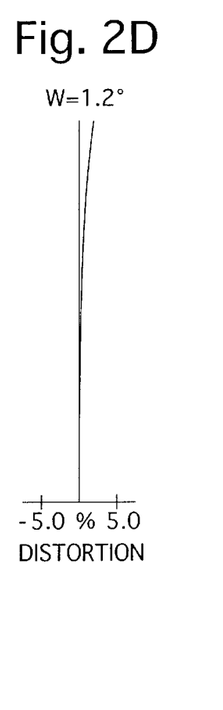

FIG. 1 and FIGS. 2A through 2D show the camera-attachment lens system AL according to the first embodiment of the present invention. FIG. 1 shows the lens arrangement of the first embodiment. FIGS. 2A through 2D show aberrations occurred in an entire optical system in which the camera-attachment lens system AL of FIG. 1 is combined with a common objective optical system 30. Table 1 shows the numerical data of the first embodiment. Surface Nos.1 through 10 indicate the objective optical system 30; and surface Nos.7 through 10 indicate the erecting optical system 40 therein. Surface Nos.11 and 12 indicate the condenser lens system 10. Surface Nos. 13 through 19 indicate the image-forming lens system 20. The first image-forming plane F1 is located 8.84 mm from Surface No. 11, i.e., the first surface of the condenser lens system 10, toward the objective optical system 30.

TABLE 1

| Surface No. | r | d | Nd | ν |
|---|---|---|---|---|
| 1 | 178.400 | 16.70 | 1.49700 | 81.6 |
| 2 | −198.400 | 2.40 | — | — |
| 3 | −198.400 | 6.00 | 1.67003 | 47.3 |
| 4 | −1583.300 | 218.80 | — | — |
| 5 | −171.700 | 2.60 | 1.51680 | 64.2 |
| 6 | −243.900 | 78.00 | — | — |
| 7 | ∞ | 47.60 | 1.51680 | 64.2 |
| 8 | ∞ | 7.00 | — | — |
| 9 | ∞ | 53.60 | 1.51680 | 64.2 |
| 10 | ∞ | 69.93 | — | — |
| 11 | 25.064 | 5.50 | 1.69680 | 55.5 |
| 12 | −217.200 | 17.91 | — | — |
| 13 | 10.200 | 2.97 | 1.51633 | 64.1 |
| 14 | 10.930 | 8.31 | — | — |
| 15 | −6.515 | 2.75 | 1.80100 | 35.0 |
| 16 | 17.160 | 5.23 | 1.69680 | 55.5 |
| 17 | −11.551 | 1.76 | — | — |
| 18 | −145.294 | 2.51 | 1.77250 | 49.6 |
| 19 | −18.660 | — | — | — | fo = 500.02
Fo = 6.25
fbo = 61.09
W = 1.2°
fa = 62.12
Fa = 12.5
fba = 104.23
m = −2.0

[Embodiment 2]

Figure 3:
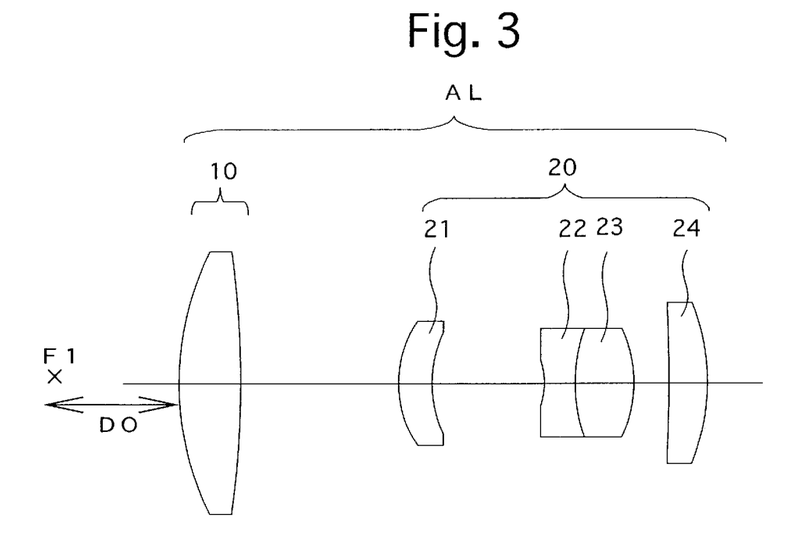
FIG. 3 shows a lens arrangement of a camera-attachment lens system according to a second embodiment of the present invention.
Figures 4A, 4B:
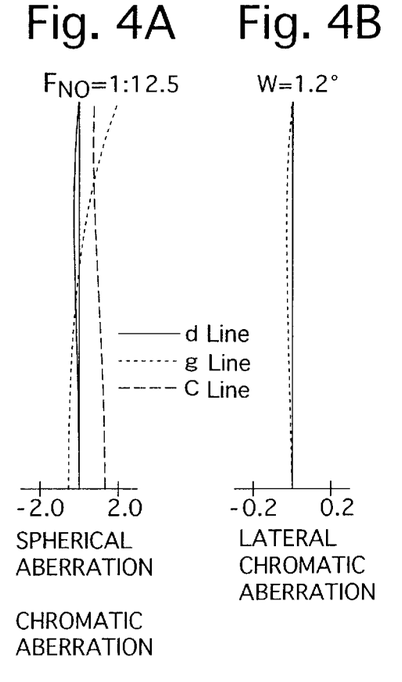
FIGS. 4A, 4B, 4C and 4D show aberrations occurred in an entire optical system in which the camera-attachment lens system of FIG. 3 is combined with the objective optical system.
Figure 4C:
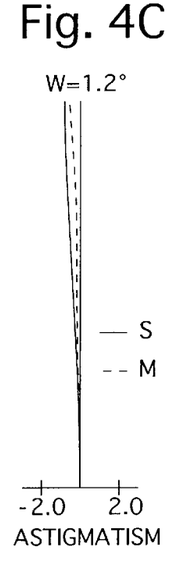
Figure 4D:
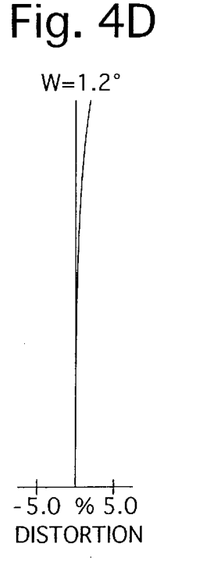

FIG. 3 and FIGS. 4A through 4D show the camera-attachment lens system AL according to the second embodiment of the present invention. FIG. 3 shows the lens arrangement of the second embodiment. FIGS. 4A through 4D show aberrations occurred in an entire optical system in which the camera-attachment lens system AL of FIG. 3 is combined with the common objective optical system 30. Table 2 shows the numerical data of the second embodiment. The basic arrangement is the same as the first embodiment. The first image-forming plane F1 is located 9.65 mm from Surface No. 11, i.e., the first surface of the condenser lens system 10, toward the objective optical system 30.

TABLE 2

| Surface No. | r | d | Nd | ν |
|---|---|---|---|---|
| 1 | 178.400 | 16.70 | 1.49700 | 81.6 |
| 2 | −198.400 | 2.40 | — | — |
| 3 | −198.400 | 6.00 | 1.67003 | 47.3 |
| 4 | −1583.300 | 218.80 | — | — |
| 5 | −171.700 | 2.60 | 1.51680 | 64.2 |
| 6 | −243.900 | 78.00 | — | — |
| 7 | ∞ | 47.60 | 1.51680 | 64.2 |
| 8 | ∞ | 7.00 | — | — |
| 9 | ∞ | 53.60 | 1.51680 | 64.2 |
| 10 | ∞ | 70.75 | — | — |
| 11 | 26.766 | 5.56 | 1.69680 | 55.5 |
| 12 | −86.000 | 14.29 | — | — |
| 13 | 10.194 | 3.00 | 1.51633 | 64.1 |
| 14 | 10.968 | 10.18 | — | — |
| 15 | −6.515 | 2.75 | 1.80100 | 35.0 |
| 16 | 14.980 | 5.25 | 1.69680 | 55.5 |
| 17 | 11.525 | 3.13 | — | — |
| 18 | −157.605 | 3.45 | 1.77250 | 49.6 |
| 19 | −19.380 | — | — | — | fo = 500.02
Fo = 6.25
fbo = 61.09
W = 1.2°
fa = 67.23
Fa = 12.5
fba = 101.85
m = −2.0

[Embodiment 3]

Figure 5:
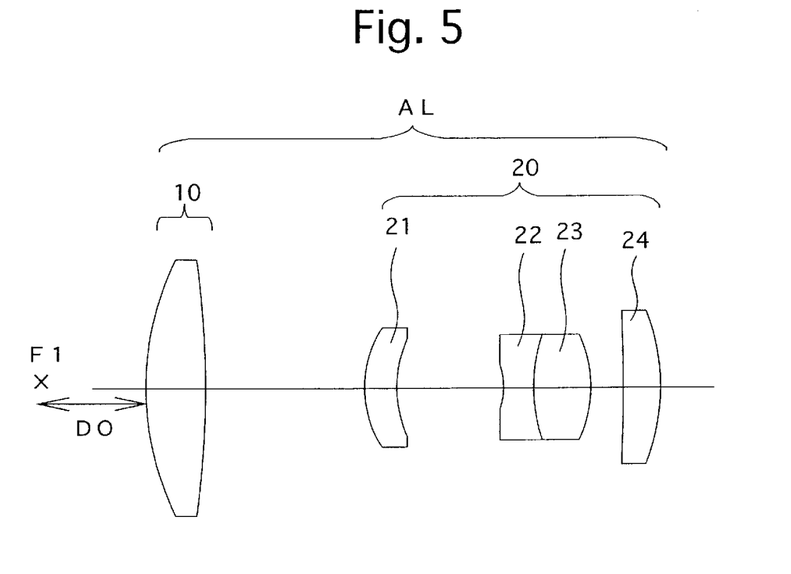
FIG. 5 shows a lens arrangement of a camera-attachment lens system according to a third embodiment of the present invention.
Figures 6A, 6B:
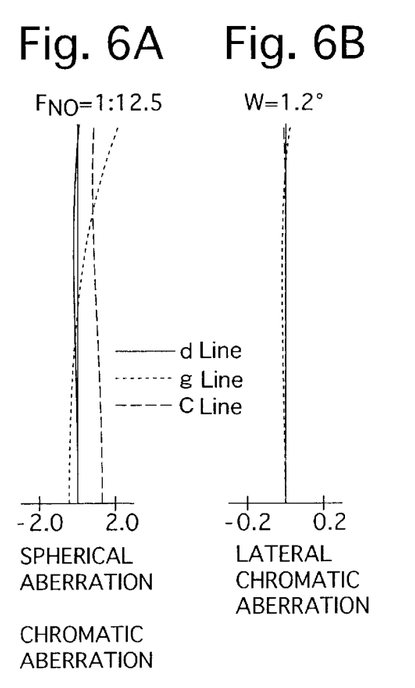
FIGS. 6A, 6B, 6C and 6D show aberrations occurred in an entire optical system in which the camera-attachment lens system of FIG. 5 is combined with the objective optical system.
Figure 6C:
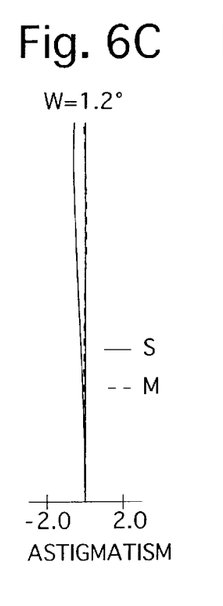
Figure 6D:
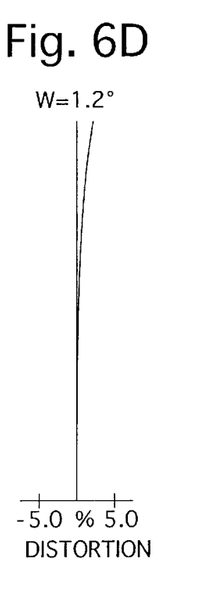

FIG. 5 and FIGS. 6A through 6D show the camera-attachment lens system AL according to the third embodiment of the present invention. FIG. 5 shows the lens arrangement of the third embodiment. FIGS. 6A through 6D show aberrations occurred in an entire optical system in which the camera-attachment lens system AL of FIG. 5 is combined with the common objective optical system 30. Table 3 shows the numerical data of the third embodiment. The basic arrangement is the same as the first embodiment. The first image-forming plane F1 is located 10.06 mm from Surface No. 11, i.e., the first surface of the condenser lens system 10, toward the objective optical system 30.

TABLE 3

| Surface No. | r | d | Nd | ν |
|---|---|---|---|---|
| 1 | 178.400 | 16.70 | 1.49700 | 81.6 |
| 2 | −198.400 | 2.40 | — | — |
| 3 | −198.400 | 6.00 | 1.67003 | 47.3 |
| 4 | −1583.300 | 218.80 | — | — |
| 5 | −171.700 | 2.60 | 1.51680 | 64.2 |
| 6 | −243.900 | 78.00 | — | — |
| 7 | ∞ | 47.60 | 1.51680 | 64.2 |
| 8 | ∞ | 7.00 | — | — |
| 9 | ∞ | 53.60 | 1.51680 | 64.2 |
| 10 | ∞ | 71.15 | — | — |
| 11 | 26.766 | 5.56 | 1.69680 | 55.5 |
| 12 | −86.000 | 14.61 | — | — |
| 13 | 10.194 | 3.00 | 1.51633 | 64.1 |
| 14 | 10.968 | 9.93 | — | — |
| 15 | −6.515 | 2.75 | 1.80100 | 35.0 |

TABLE 3-continued

| Surface No. | r | d | Nd | ν |
|---|---|---|---|---|
| 16 | 14.980 | 5.25 | 1.69680 | 55.5 |
| 17 | −11.525 | 2.96 | — | — |
| 18 | −157.605 | 3.45 | 1.77250 | 49.6 |
| 19 | −19.380 | — | — | — | fo = 500.02
Fo = 6.25
fbo = 61.09
W = 1.20
fa = 66.37
Fa = 12.5
fba = 101.10
m = −2.0

[Embodiment 4]

Figure 7:
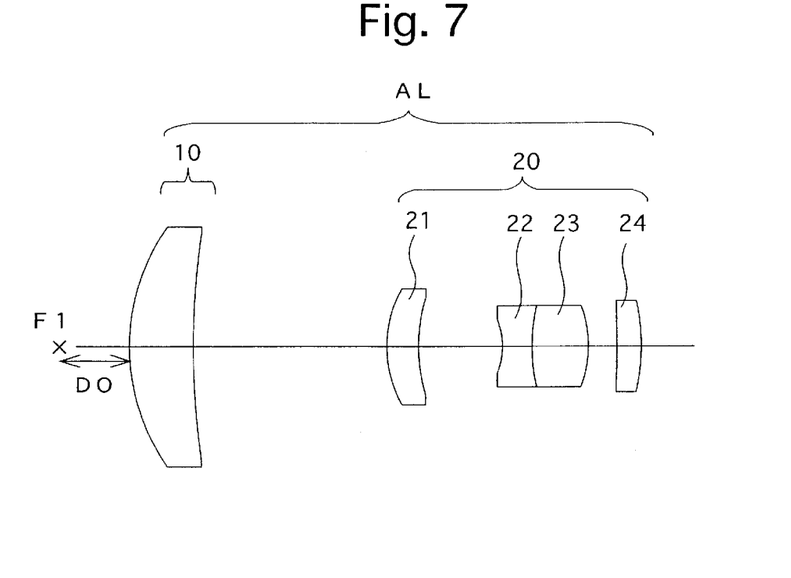
FIG. 7 shows a lens arrangement of a camera-attachment lens system according to a fourth embodiment of the present invention.
Figures 8A, 8B:
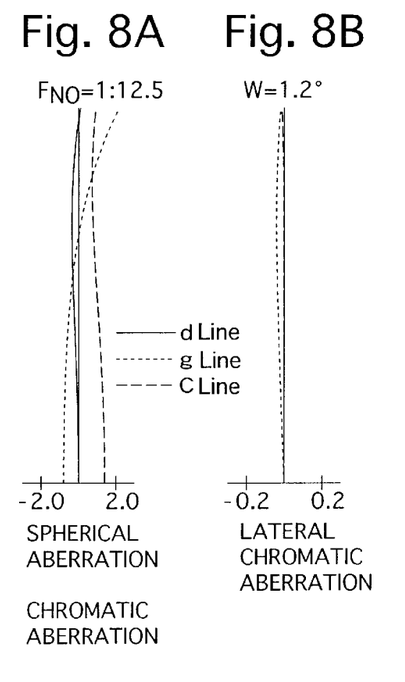
FIGS. 8A, 8B, 8C and 8D show aberrations occurred in an entire optical system in which the camera-attachment lens system of FIG. 7 is combined with the objective optical system.
Figure 8C:
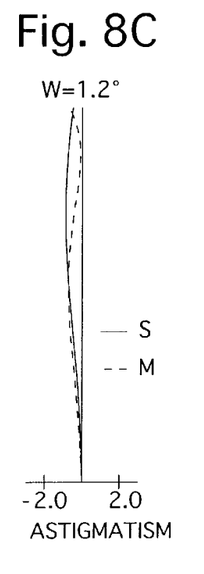
Figure 8D:
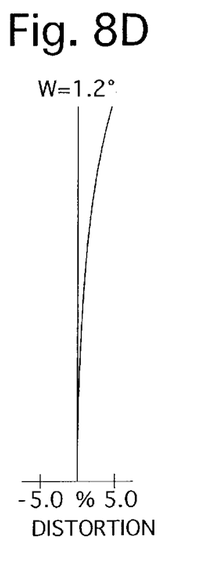

FIG. 7 and FIGS. 8A through 8D show the camera-attachment lens system AL according to the fourth embodiment of the present invention. FIG. 7 shows the lens arrangement of the fourth embodiment. FIGS. 8A through 8D show aberrations occurred in an entire optical system in which the camera-attachment lens system AL of FIG. 7 is combined with the common objective optical system 30. Table 4 shows the numerical data of the fourth embodiment. The basic arrangement is the same as the first embodiment. The first image-forming plane F1 is located 5.16 mm from Surface No. 11, i.e., the first surface of the condenser lens system 10, toward the objective optical system 30.

TABLE 4

| Surface No. | r | d | Nd | ν |
|---|---|---|---|---|
| 1 | 178.400 | 16.70 | 1.49700 | 81.6 |
| 2 | −198.400 | 2.40 | — | — |
| 3 | −198.400 | 6.00 | 1.67003 | 47.3 |
| 4 | −1583.300 | 218.80 | — | — |
| 5 | −171.700 | 2.60 | 1.51680 | 64.2 |
| 6 | −243.900 | 78.00 | — | — |
| 7 | ∞ | 47.60 | 1.51680 | 64.2 |
| 8 | ∞ | 7.00 | — | — |
| 9 | ∞ | 53.60 | 1.51680 | 64.2 |
| 10 | ∞ | 66.25 | — | — |
| 11 | 19.359 | 6.00 | 1.69680 | 55.5 |
| 12 | 71.908 | 18.00 | — | — |
| 13 | 11.034 | 3.00 | 1.48749 | 70.2 |
| 14 | 15.863 | 7.90 | — | — |
| 15 | −6.500 | 2.75 | 1.83400 | 37.2 |
| 16 | 17.648 | 5.25 | 1.69680 | 55.5 |
| 17 | −10.589 | 2.65 | — | — |
| 18 | −154.937 | 2.27 | 1.69680 | 55.5 |
| 19 | −18.633 | — | — | — | fo = 500.02
Fo = 6.25
fbo = 61.09
W = 1.2°
fa = 61.13
Fa = 12.5
fba = 107.04
m = −2.0

The numerical values of each condition of each embodiment are shown in the following Table 5.

TABLE 5

|  | Embod. 1 | Embod. 2 | Embod. 3 | Embod. 4 |
|---|---|---|---|---|
| Condition (1) | 1.91 | 2.25 | 2.22 | 1.68 |
| Condition (2) | 0.142 | 0.144 | 0.152 | 0.084 |
| Condition (3) | 1.697 | 1.697 | 1.697 | 1.697 |
| Condition (4) | 1.662 | 1.662 | 1.662 | 1.627 |

TABLE 5-continued

|  | Embod. 1 | Embod. 2 | Embod. 3 | Embod. 4 |
|---|---|---|---|---|
| Condition (5) | 0.50 | 0.56 | 0.55 | 0.99 |
| Condition (6) | 5.68 | 6.13 | 6.05 | 3.85 |

As can be understood from Table 5, the numerical values of each of the first through fourth embodiments satisfy conditions (1) through (6). Furthermore, as can be understood from the aberration diagrams, aberrations including field curvature and astigmatism are adequately corrected.

According to the above description, a camera-attachment lens system, which can reduce field curvature and astigmatism, and can maintain suitable image-forming performance up to the periphery of the view field, can be obtained.

What is claimed is:

1. A camera-attachment lens system that is provided behind an objective optical system, and is arranged to relay a real image formed by said objective optical system, and to re-form a real image, said camera-attachment lens system comprising a positive condenser lens and a positive image-forming lens system, in this order from said objective optical system;

wherein said camera-attachment lens system satisfies the following conditions:

$1.5 < fa/fco < 2.4$ $0.08 < DO/fa < 0.16$ $1.65 < Nco$ wherein fa designates the combined focal length of said condenser lens and said image-forming lens system without any intervening lenses;

fco designates the focal length of said condenser lens;

DO designates the distance, along the optical axis, from said image-forming plane of said objective optical system to the most objective-optical-system side surface of said condenser lens; and Nco designates the refractive index of the condenser lens.

2. The camera-attachment lens system according to claim 1, wherein said image-forming lens system comprises a meniscus first lens element having the convex surface facing toward said objective optical system, cemented lens elements comprising a negative biconcave second lens element and a positive biconvex third lens element, and a positive fourth lens element, in this order from said objective optical system, wherein said image-forming lens system satisfies the following conditions:

$1.60 < Np$ $0.3 < fa/f1 < 1.3$ $3.5 < fa/r_{1-2} < 6.5$ wherein

Np designates the average refractive index of said positive lens elements in said image-forming lens system;

f1 designates the focal length of said first lens element of said image-forming lens system; and $r_{1-2}$ designates the radius of curvature of the surface of said first lens element, the surface of which faces toward a re-image-forming plane.

3. A camera-attachment lens system that is provided behind an objective optical system, and is arranged to relay a real image formed by said objective optical system, and to re-form a real image, said camera-attachment lens system comprising a positive condenser lens and a positive image-forming lens system, in this order from said objective optical system;

wherein said image-forming lens system comprises a meniscus first lens element having the convex surface facing toward said objective optical system, cemented lens elements comprising a negative biconcave second lens element and a positive biconvex third lens element, and a positive fourth lens element, in this order from said objective optical system.

* * * * *